US012674535B2

(12) United States Patent
Vranish

(10) Patent No.: US 12,674,535 B2
(45) Date of Patent: *Jul. 7, 2026

(54) LOW-SPILL COUPLING ASSEMBLY

(71) Applicant: Colder Products Company, Roseville, MN (US)

(72) Inventor: David J. Vranish, Mound, MN (US)

(73) Assignee: Colder Products Company, Roseville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/456,835

(22) Filed: Jan. 22, 2026

(65) Prior Publication Data

US 2026/0153180 A1      Jun. 4, 2026

Related U.S. Application Data

(63) Continuation of application No. 19/298,508, filed on Aug. 13, 2025, now Pat. No. 12,590,662, which is a continuation of application No. 19/295,097, filed on Aug. 8, 2025, now Pat. No. 12,601,437, which is a continuation of application No. 18/999,210, filed on Dec. 23, 2024, now Pat. No. 12,486,936, which is a continuation of application No. 18/768,597, filed on Jul. 10, 2024, now Pat. No. 12,455,031, which is a continuation of application No. 18/767,066, filed on Jul. 9, 2024, now Pat. No. 12,455,030, which is a
(Continued)

(51) Int. Cl.
| | |
|---|---|
| *F16L 37/413* | (2006.01) |
| *F16L 27/073* | (2006.01) |
| *F16L 37/086* | (2006.01) |
| *F16L 37/34* | (2006.01) |
| *F16L 37/35* | (2006.01) |

(52) U.S. Cl.
CPC ........... *F16L 37/413* (2013.01); *F16L 27/073* (2013.01); *F16L 37/086* (2013.01); *F16L 37/34* (2013.01); *F16L 37/35* (2013.01); *Y10T 137/87957* (2015.04)

(58) Field of Classification Search
CPC ..... Y10T 137/87941; Y10T 137/87965; Y10T 137/87957; Y10T 137/87949; F16L 37/35; F16L 37/0841; F16L 37/30; F16L 37/32; F16L 37/34; F16L 37/36; F16L 37/413; F16L 29/04; F16L 29/073
See application file for complete search history.

(56) References Cited

U.S. PATENT DOCUMENTS

| | | |
|---|---|---|
| 2,854,259 A | 9/1958 | Clark |
| 3,334,659 A | 8/1967 | Magorien |
| | (Continued) | |

FOREIGN PATENT DOCUMENTS

| | | |
|---|---|---|
| JP | D1734638 | 1/2023 |

OTHER PUBLICATIONS

International Search Report and Written Opinion for PCT/US2014/027937 mailed Jul. 8, 2014.
(Continued)

*Primary Examiner* — Craig M Schneider
*Assistant Examiner* — Andrew J Rost
(74) *Attorney, Agent, or Firm* — Fish & Richardson P.C.

(57) ABSTRACT

The present disclosure relates to a low-spill coupling assembly including a female coupling device and a male coupling device.

27 Claims, 17 Drawing Sheets

Related U.S. Application Data continuation of application No. 18/765,777, filed on Jul. 8, 2024, now Pat. No. 12,129,952, which is a continuation of application No. 18/761,002, filed on Jul. 1, 2024, now Pat. No. 12,123,531, which is a continuation of application No. 18/427,004, filed on Jan. 30, 2024, now Pat. No. 12,025,256, which is a continuation of application No. 18/532,514, filed on Dec. 7, 2023, now Pat. No. 12,359,759, which is a continuation of application No. 17/362,288, filed on Jun. 29, 2021, now Pat. No. 11,885,451, which is a continuation of application No. 16/670,294, filed on Oct. 31, 2019, now Pat. No. 11,079,052, which is a continuation of application No. 16/668,537, filed on Oct. 30, 2019, now Pat. No. 11,060,650, which is a continuation of application No. 14/567,254, filed on Dec. 11, 2014, now Pat. No. 11,067,210, which is a continuation-in-part of application No. 14/212,322, filed on Mar. 14, 2014, now abandoned.

(60) Provisional application No. 61/799,612, filed on Mar. 15, 2013.

(56) References Cited

U.S. PATENT DOCUMENTS

| | | | |
|---|---|---|---|
| 3,918,492 | A | 11/1975 | Karcher |
| 4,079,966 | A | 3/1978 | Berry et al. |
| 4,327,770 | A | 5/1982 | Brown et al. |
| 4,340,052 | A | 7/1982 | Dennehey et al. |
| 4,447,040 | A | 5/1984 | Magorian |
| 4,541,457 | A | 9/1985 | Blenkush |
| D298,605 | S | 11/1988 | Colgan et al. |
| 4,875,711 | A | 10/1989 | Watanabe |
| 4,892,117 | A | 1/1990 | Spalink |
| 4,919,457 | A | 4/1990 | Moretti |
| 4,936,345 | A | 6/1990 | Nix |
| D309,774 | S | 8/1990 | Lewis |
| D313,067 | S | 12/1990 | Kotake et al. |
| 4,991,627 | A | 2/1991 | Nix |
| 5,018,352 | A | 5/1991 | Compton |
| 5,104,158 | A | 4/1992 | Meyer et al. |
| 5,113,657 | A | 5/1992 | Compton et al. |
| 5,139,049 | A | 8/1992 | Jensen et al. |
| 5,215,122 | A | 6/1993 | Rogers et al. |
| 5,292,157 | A | 3/1994 | Rubichon |
| 5,316,041 | A | 5/1994 | Ramacier, Jr. et al. |
| 5,337,782 | A | 8/1994 | Wilcox |
| 5,339,862 | A | 8/1994 | Haunhorst |
| 5,482,083 | A | 1/1996 | Jenski |
| 5,494,073 | A | 2/1996 | Saito |
| 5,494,074 | A | 2/1996 | Ramacier et al. |
| 5,546,985 | A | 8/1996 | Bartholomew |
| 5,703,243 | A | 12/1997 | Nishitani et al. |
| 5,709,243 | A | 1/1998 | Wells et al. |
| D396,730 | S | 8/1998 | Schaupp |
| 5,911,403 | A | 6/1999 | deCler et al. |
| 5,938,244 | A | 8/1999 | Meyer |
| 5,975,489 | A | 11/1999 | deCler et al. |
| D419,860 | S | 2/2000 | Persson |
| 6,024,124 | A | 2/2000 | Braun et al. |
| 6,082,399 | A | 7/2000 | Nyberg |
| 6,082,401 | A | 7/2000 | Braun et al. |
| 6,095,190 | A | 8/2000 | Wilcox et al. |
| 6,116,277 | A | 9/2000 | Wilcox et al. |
| 6,176,263 | B1 | 1/2001 | Lacroix et al. |
| 6,283,151 | B1 | 9/2001 | Countryman et al. |
| 6,328,348 | B1 | 12/2001 | Cornford et al. |
| 6,386,596 | B1 | 5/2002 | Olson |
| D468,016 | S | 12/2002 | Mosler et al. |
| 6,517,121 | B1 | 2/2003 | Cresswell |

| | | | |
|---|---|---|---|
| 6,681,803 | B2 | 1/2004 | Taneya et al. |
| 6,685,230 | B1 | 2/2004 | Bottura |
| D494,256 | S | 8/2004 | Nortier |
| 6,802,399 | B2 | 10/2004 | Niebling et al. |
| 7,044,161 | B2 | 5/2006 | Tiberghien |
| 7,063,357 | B1 | 6/2006 | Bay |
| 7,185,674 | B2 | 3/2007 | Taylor |
| 7,213,845 | B2 | 5/2007 | Sato |
| 7,434,842 | B2 | 10/2008 | Schmidt |
| 7,434,844 | B2 | 10/2008 | Kao |
| 7,469,472 | B2 | 12/2008 | deCler et al. |
| 7,547,047 | B2 | 6/2009 | deCler et al. |
| 7,568,737 | B2 | 8/2009 | Wells et al. |
| D602,128 | S | 10/2009 | Williams |
| D608,424 | S | 1/2010 | Katsuta et al. |
| D610,760 | S | 2/2010 | Zugen et al. |
| 7,708,029 | B2 | 5/2010 | Kitagawa et al. |
| 7,828,336 | B2 | 11/2010 | Gammons |
| 7,980,599 | B2 | 7/2011 | Schindel |
| 8,028,718 | B2 | 10/2011 | Tiberghien |
| D648,008 | S | 11/2011 | Percoco et al. |
| D654,573 | S | 2/2012 | Lombardi et al. |
| 8,201,853 | B2 | 6/2012 | Tiberghien et al. |
| D679,784 | S | 4/2013 | Meyer |
| D687,528 | S | 8/2013 | Meyer |
| 8,590,860 | B2 | 11/2013 | Kitagawa |
| 8,764,068 | B2 | 7/2014 | Frick et al. |
| 8,870,235 | B2 | 10/2014 | Turk |
| 8,899,284 | B2 | 12/2014 | Hemingway |
| 8,910,980 | B2 | 12/2014 | Neal et al. |
| D730,495 | S | 5/2015 | Umehara |
| 9,157,560 | B2 | 10/2015 | Rehder et al. |
| D752,721 | S | 3/2016 | Wildfang et al. |
| D758,555 | S | 6/2016 | Van Dyke et al. |
| D761,395 | S | 7/2016 | Plackner et al. |
| D788,890 | S | 6/2017 | Downs et al. |
| 9,689,516 | B2 | 6/2017 | Frick et al. |
| D816,191 | S | 4/2018 | Cove |
| D816,211 | S | 4/2018 | Guala |
| D830,523 | S | 10/2018 | Vranish |
| D830,524 | S | 10/2018 | Vranish |
| D838,350 | S | 1/2019 | Downs et al. |
| D879,250 | S | 3/2020 | Vranish |
| D898,878 | S | 10/2020 | Sprenger |
| D912,202 | S | 3/2021 | Takezawa |
| D953,495 | S | 5/2022 | Banks |
| D1,010,776 | S | 1/2024 | Ingram |
| D1,016,251 | S | 2/2024 | Castriotta |
| D1,020,986 | S | 4/2024 | Del Piero |
| D1,031,948 | S | 6/2024 | Clevenger |
| D1,043,924 | S | 9/2024 | Sprenger |
| D1,068,039 | S | 3/2025 | Gao |
| D1,088,195 | S | 8/2025 | Vranish |
| 12,455,030 | B2 * | 10/2025 | Vranish .................. F16L 37/34 |
| 12,455,031 | B2 * | 10/2025 | Vranish .................. F16L 37/34 |
| 2005/0001425 | A1 | 1/2005 | deClear et al. |
| 2007/0029796 | A1 | 2/2007 | Bibby |
| 2007/0035129 | A1 | 2/2007 | Chappaz |
| 2007/0120361 | A1 | 5/2007 | Kao |
| 2009/0167018 | A1 | 7/2009 | Lien |
| 2010/0019487 | A1 | 1/2010 | deCler et al. |
| 2010/0051129 | A1 | 3/2010 | Kitagawa |
| 2011/0067225 | A1 | 3/2011 | Bassaco |
| 2013/0092271 | A1 | 4/2013 | Downs et al. |
| 2014/0060675 | A1 | 3/2014 | Wilhelm et al. |
| 2014/0261819 | A1 | 9/2014 | Vranish |
| 2015/0090915 | A1 | 4/2015 | Vranish |
| 2015/0267851 | A1 | 9/2015 | Aoki |
| 2025/0065668 | A1 | 2/2025 | Raves |

OTHER PUBLICATIONS

International Preliminary Report on Patentability in Application No. PCT/US2014/027397, dated Sep. 15, 2015, 6 pages.

* cited by examiner

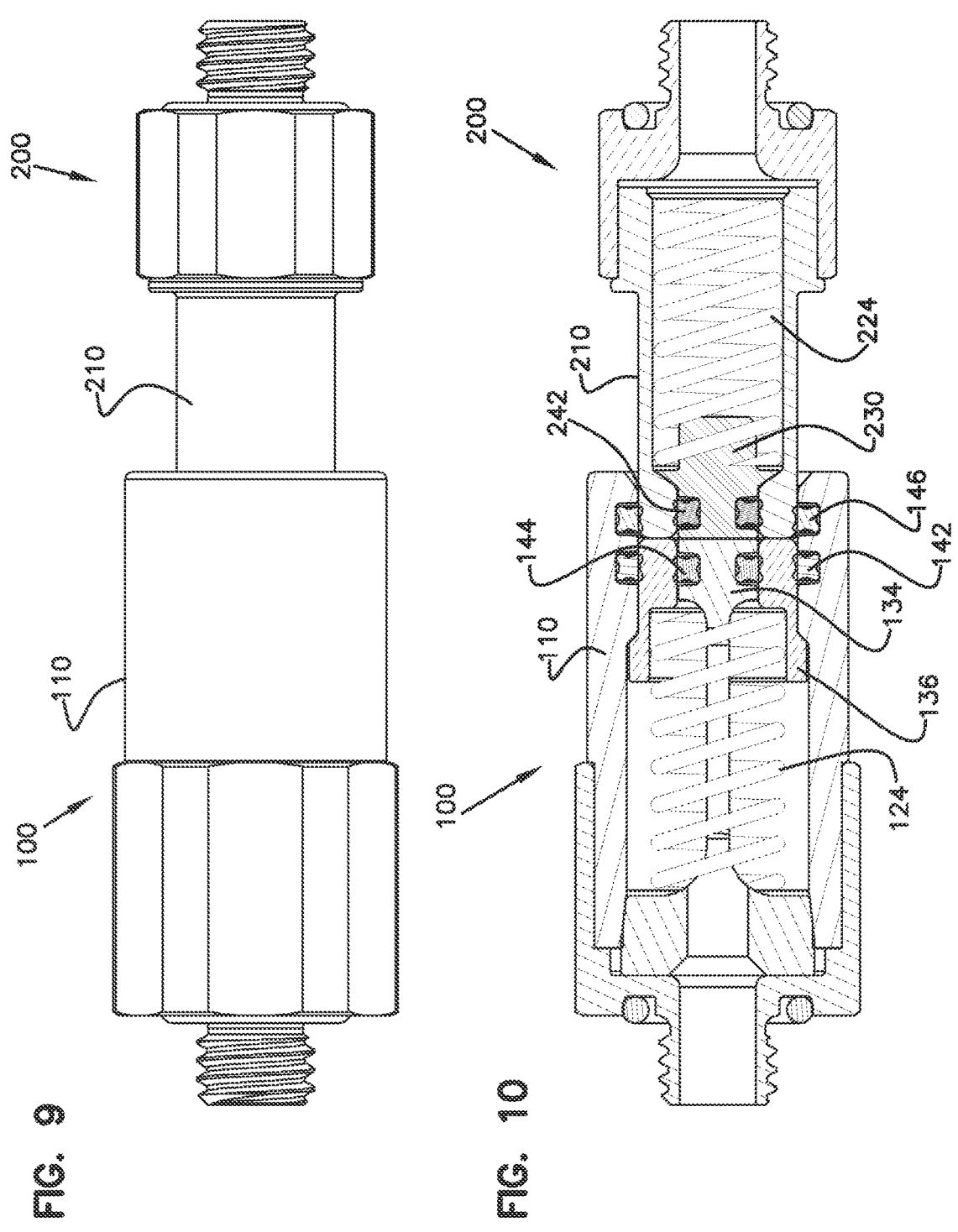

FIG. 24

LOW-SPILL COUPLING ASSEMBLY

CROSS-REFERENCE TO RELATED APPLICATIONS

This is a continuation of and claims priority to U.S. patent application Ser. No. 19/298,508 filed Aug. 13, 2025, which is a continuation of and claims priority to U.S. patent application Ser. No. 19/295,097 filed Aug. 8, 2025, which is a continuation of and claims priority to U.S. patent application Ser. No. 18/999,210 filed Dec. 23, 2024 (now U.S. Pat. No. 12,486,936), which is a continuation of and claims priority to U.S. patent application Ser. No. 18/768,597 filed Jul. 10, 2024 (now U.S. Pat. No. 12,455,031), which is a continuation of and claims priority to U.S. patent application Ser. No. 18/767,066 filed Jul. 9, 2024 (now U.S. Pat. No. 12,455,030), which is a continuation of U.S. patent application Ser. No. 18/765,777 filed on Jul. 8, 2024 (now U.S. Pat. No. 12,129,952), which is a continuation of U.S. patent application Ser. No. 18/761,002 filed on Jul. 1, 2024 (now U.S. Pat. No. 12,123,531), which is a continuation of U.S. patent application Ser. No. 18/427,004 filed on Jan. 30, 2024 (now U.S. Pat. No. 12,025,256), which is a continuation of and claims priority to U.S. patent application Ser. No. 18/532,514 filed on Dec. 7, 2023 (now U.S. Pat. No. 12,359,759), which is a continuation of and claims priority to U.S. patent application Ser. No. 17/362,288 filed on Jun. 29, 2021 (now U.S. Pat. No. 11,885,451), which is a continuation of and claims priority to U.S. patent application Ser. No. 16/670,294 filed on Oct. 31, 2019 (now U.S. Pat. No. 11,079,052), which is a continuation of and claims priority to U.S. patent application Ser. No. 16/668,537 filed on Oct. 30, 2019 (now U.S. Pat. No. 11,060,650), which is a continuation of and claims priority to U.S. patent application Ser. No. 14/567,254 filed on Dec. 11, 2014 (now U.S. Pat. No. 11,067,210), which is a continuation-in-part of U.S. patent application Ser. No. 14/212,322 filed on Mar. 14, 2014, which is a nonprovisional of and claims priority to U.S. patent application Ser. No. 61/799,612 filed on Mar. 15, 2013, the disclosures of all of which are expressly incorporated herein by reference in their entirety.

BACKGROUND

Coupling assemblies typically include female and male couplings that are connected to create a fluid flow path therebetween. Such coupling assemblies can be used in various applications, including biomedical applications, beverage dispensing, instrument connections, photochemical handling, liquid cooling of electronics, ink handling, and others.

SUMMARY

In one aspect, a coupling system includes: a female coupling device, the female coupling device including a first main body with a first front face, the first front face defining a first opening leading into a first fluid passageway; a stem having a stem head positioned within a sleeve; a first spring positioned about the stem that biases the sleeve into a closed position; a first seal that seals between the main body and the sleeve; a second seal that seals between the sleeve and the stem head; and a third seal that is positioned at the opening of the main body. The coupling system includes: a male coupling device, the male coupling device including a second main body with a second front face, the second front face defining a second opening leading into a second fluid passageway; a valve member and a second spring positioned within the second fluid passageway; and a major seal that seals between the second main body and the valve member. The second main body of the male coupling device is capable of being inserted into the first opening of the first main body of the female coupling device so that the first seal and the third seal of the female coupling device engage the second main body of the male coupling device. The sleeve and the valve member are displaced against the first and second springs such that the second seal and the major seal are disengaged so that fluid flows through the first and second fluid passageways.

In another aspect, a female coupling device includes: a main body having a front face, the front face defining an opening leading into a fluid passageway; a stem having a stem head positioned within a sleeve; a spring positioned about the stem that biases the sleeve into a closed position; a first seal that seals between the main body and the sleeve; a second seal that seals between the sleeve and the stem head; and a third seal that is positioned at the opening of the main body to seal against a mating male coupling device. The male coupling device is capable of being inserted into the opening of the main body of the female coupling device.

In a further aspect, a female coupling device includes: a main body having a front face, the front face defining an opening leading into a fluid passageway; a stem having a stem head positioned within a sleeve; a spring positioned about the stem that biases the sleeve into a closed position; a first seal that seals between the main body and the sleeve; a second seal that seals between the sleeve and the stem head; a third seal that is positioned at the opening of the main body to seal against a mating male coupling device; and a clip member slidably mounted on the female coupling device, the clip member slidable between a connecting position wherein the clip member engages the mating male coupling device and a disconnecting position wherein the clip member is disengaged from the mating male coupling device.

A further aspect still relates to a coupling system including: a female coupling device, the female coupling device including: a first main body with a first front face, the first front face defining a first opening leading into a first fluid passageway; a stem having a stem head positioned within a sleeve; a first spring positioned about the stem that biases the sleeve into a closed position; a first seal that seals between the main body and the sleeve; a second seal that seals between the sleeve and the stem head; a third seal that is positioned at the opening of the main body; and a clip member slidably mounted on the female coupling device. The coupling system includes a male coupling device, the male coupling device including: a second main body with a second front face, the second front face defining a second opening leading into a second fluid passageway; a valve member and a second spring positioned within the second fluid passageway; and a major seal that seals between the second main body and the valve member. The clip member is slidable between a connecting position where the clip member engages the male coupling device and a disconnecting position where the clip member is disengaged from the male coupling device. The second main body of the male coupling device is capable of being inserted into the first opening of the first main body of the female coupling device so that the first seal and the third seal of the female coupling device engage the second main body of the male coupling device. The sleeve and the valve member are displaced against the first and second springs such that the second seal and the major seal are disengaged so that fluid flows through the first and second fluid passageways.

DESCRIPTION OF THE DRAWINGS

Reference is now made to the accompanying drawings, which are not necessarily drawn to scale.

FIG. 9 is a side view of a coupling assembly including the female and male coupling devices in a pre-coupled position.

FIG. 10 is a cross-sectional view of the female and male coupling devices of FIG. 9.

FIG. 24 is a cross-sectional view of the female and male coupling devices of FIG. 23.

DETAILED DESCRIPTION

Figure 1:
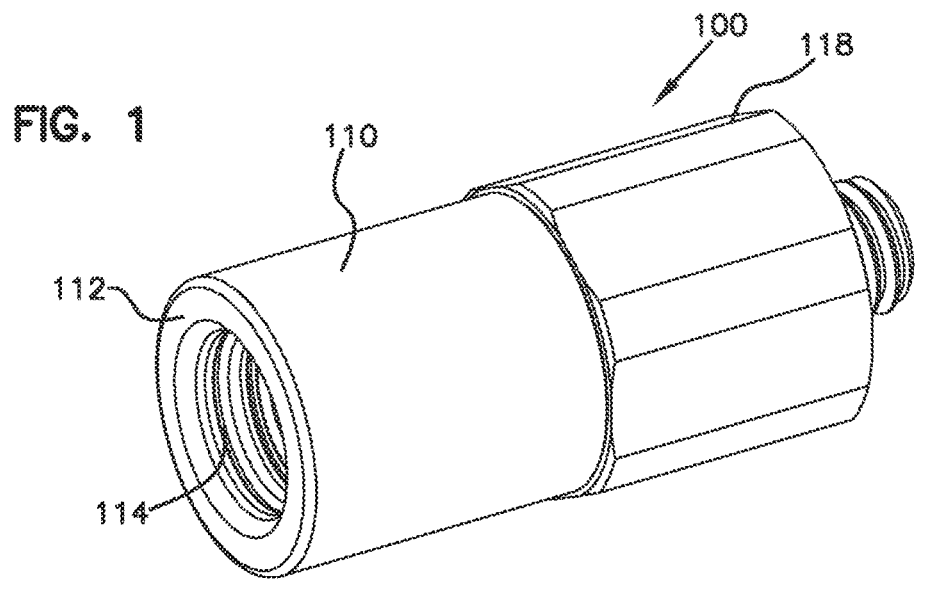
FIG. 1 is a perspective of an example female coupling device.
Figure 2:
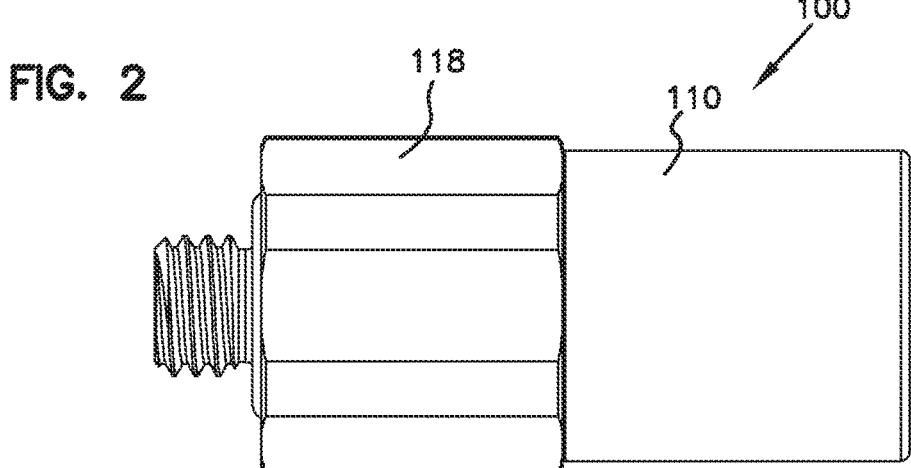
FIG. 2 is a side view of the female coupling device of FIG. 1.
Figure 3:
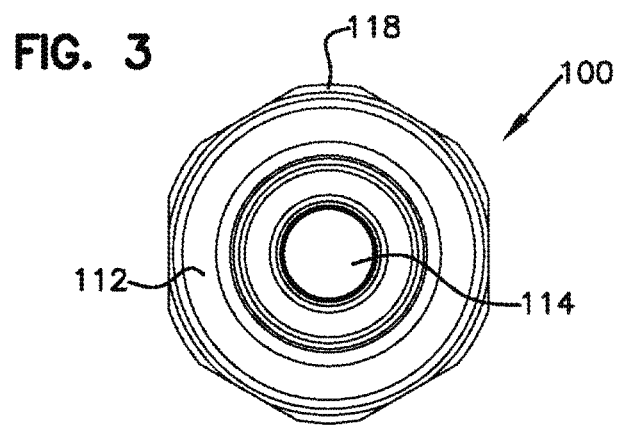
FIG. 3 is an end view of the female coupling device of FIG. 1.
Figure 4:
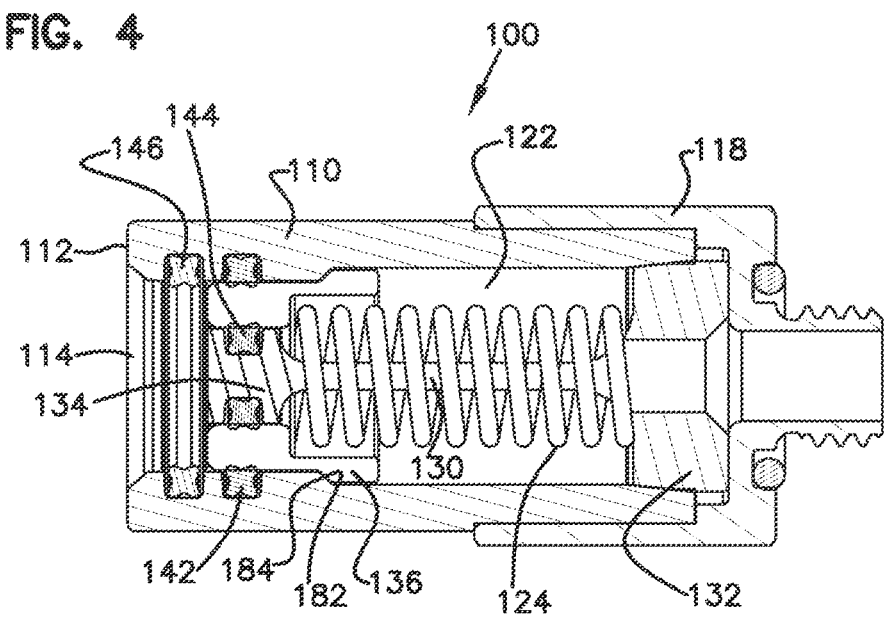
FIG. 4 is a cross-sectional view of the female coupling device of FIG. 1.
Figure 8:
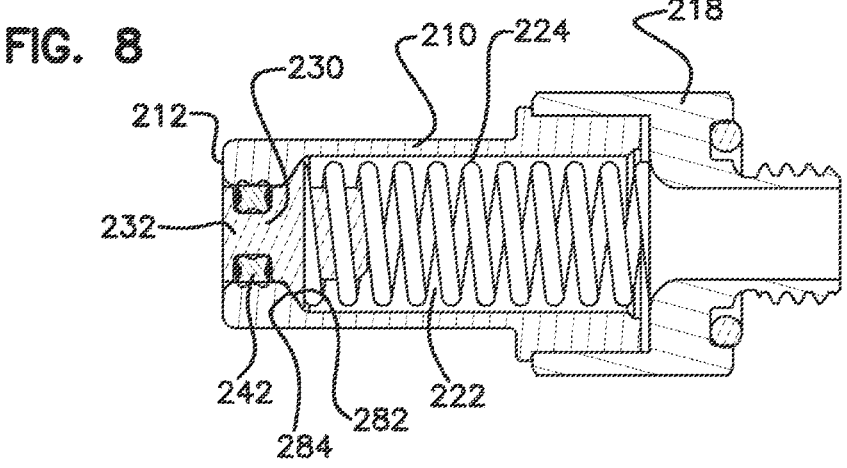
FIG. 8 is a cross-sectional view of the male coupling device of FIG. 5.
Figure 5:
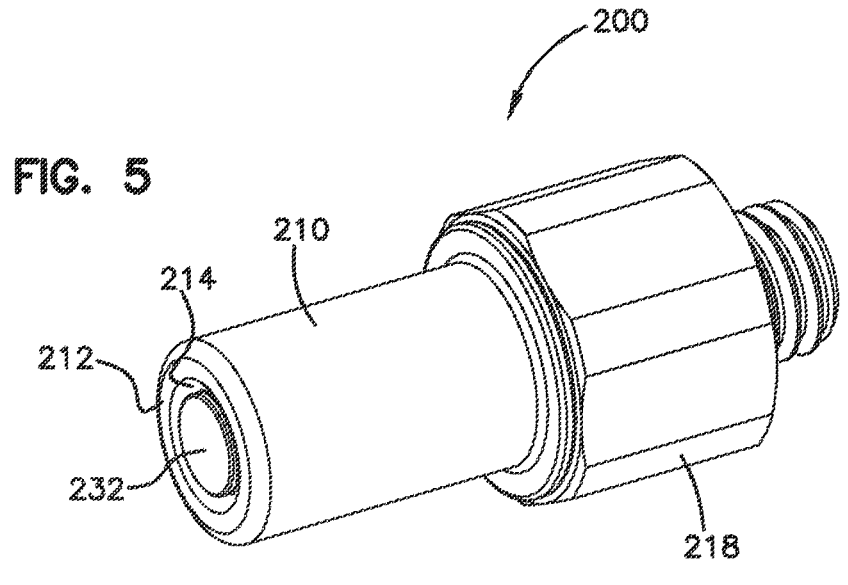
FIG. 5 is a perspective of an example male coupling device.
Figure 6:
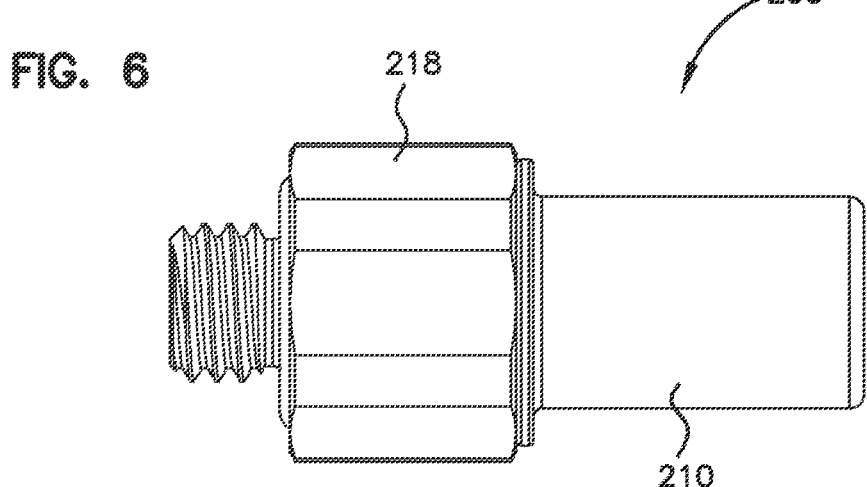
FIG. 6 is a side view of the male coupling device of FIG. 5.
Figure 7:
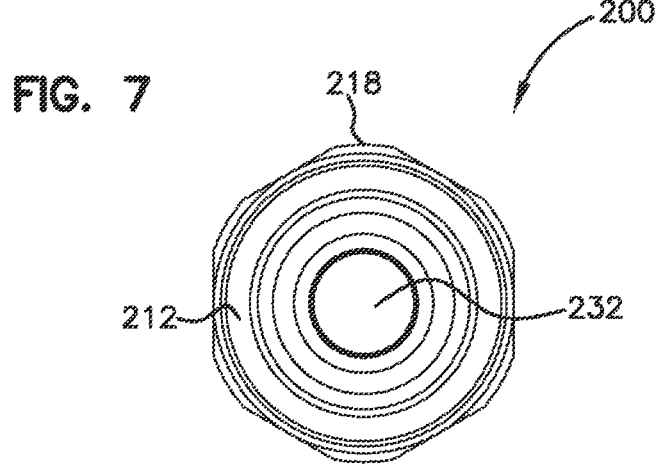
FIG. 7 is an end view of the male coupling device of FIG. 5.

The present disclosure relates to a low-spill coupling assembly including a female coupling device and a male coupling device. Additional details are provided below.

Referring now to FIGS. 1-4, an example female coupling device 100 is shown.

The female coupling device 100 includes a main body 110 having a front face 112. The front face 112 defines an opening 114 leading into a fluid passageway 122.

The female coupling device 100 also includes a termination 118 coupled to the main body 110 using known techniques, such as sonic welding, staking, press-fitting, and threading. The termination 118 is configured to be coupled to another component, such as a fluid line or device.

The example female coupling device 100 includes a stem 130, sleeve 136, and spring 124 positioned within the fluid passageway 122.

The stem 130 includes a base end 132 positioned against the termination 118. The stem 130 also includes a stem head 134 positioned within the sleeve 136. The spring 124 is positioned about the stem 130 and biases the sleeve 136 into the closed position shown in FIG. 4. In this position, a shoulder 182 on the sleeve 136 engages a surface 184 formed by the main body 110 to limit further travel of the sleeve 136 in a direction toward the front face 112.

In this position, a first seal 142 provides a seal between the main body 110 and the sleeve 136. In addition, a second seal 144 provides a seal between the sleeve 136 and the stem head 134. These seals limit movement of fluid through the fluid passageway 122.

A further third seal 146 is positioned at the opening 114 of the main body 110 to seal against a mating male coupling device 200, described below.

Referring now to FIGS. 5-8, the male coupling device 200 is shown.

The male coupling device 200 includes a main body 210 having a front face 212. The front face 212 defines an opening 214 leading into a fluid passageway 222.

The male coupling device 200 also includes a termination 218 coupled to the main body 210 using known techniques, such as sonic welding or staking. The termination 218 is configured to be coupled to another component, such as a fluid line.

The example male coupling device 200 includes a valve member 230 and spring 224 positioned within the fluid passageway 222. The spring 224 is biases the valve member 230 into the closed position shown in FIG. 8. A front surface 232 of the valve member 230 is exposed at the front face 212 of the main body 210. In this position, a shoulder 282 on the valve member 230 engages a surface 284 formed by the main body 210 to limit further travel of the valve member 230 in a direction toward the front face 212.

In this position, a first seal 242 provides a seal between the main body 210 and the valve member 230. The seal limits movement of fluid through the fluid passageway 222.

Referring now to FIGS. 9-10, the female coupling device 100 and the male coupling device 200 are shown in a pre-coupled position. In this position, the main body 210 of the male coupling device 200 is partially inserted into the opening 114 of the main body 110 of the female coupling device 100.

In this position, the front surface 232 of the valve member 230 engages the stem head 134. In addition, the front face 212 engages the sleeve 136. Further, the third seal 146 seals against the main body 210 of the male coupling device 200 so that a fluid-tight configuration is created.

Figures 11, 12:
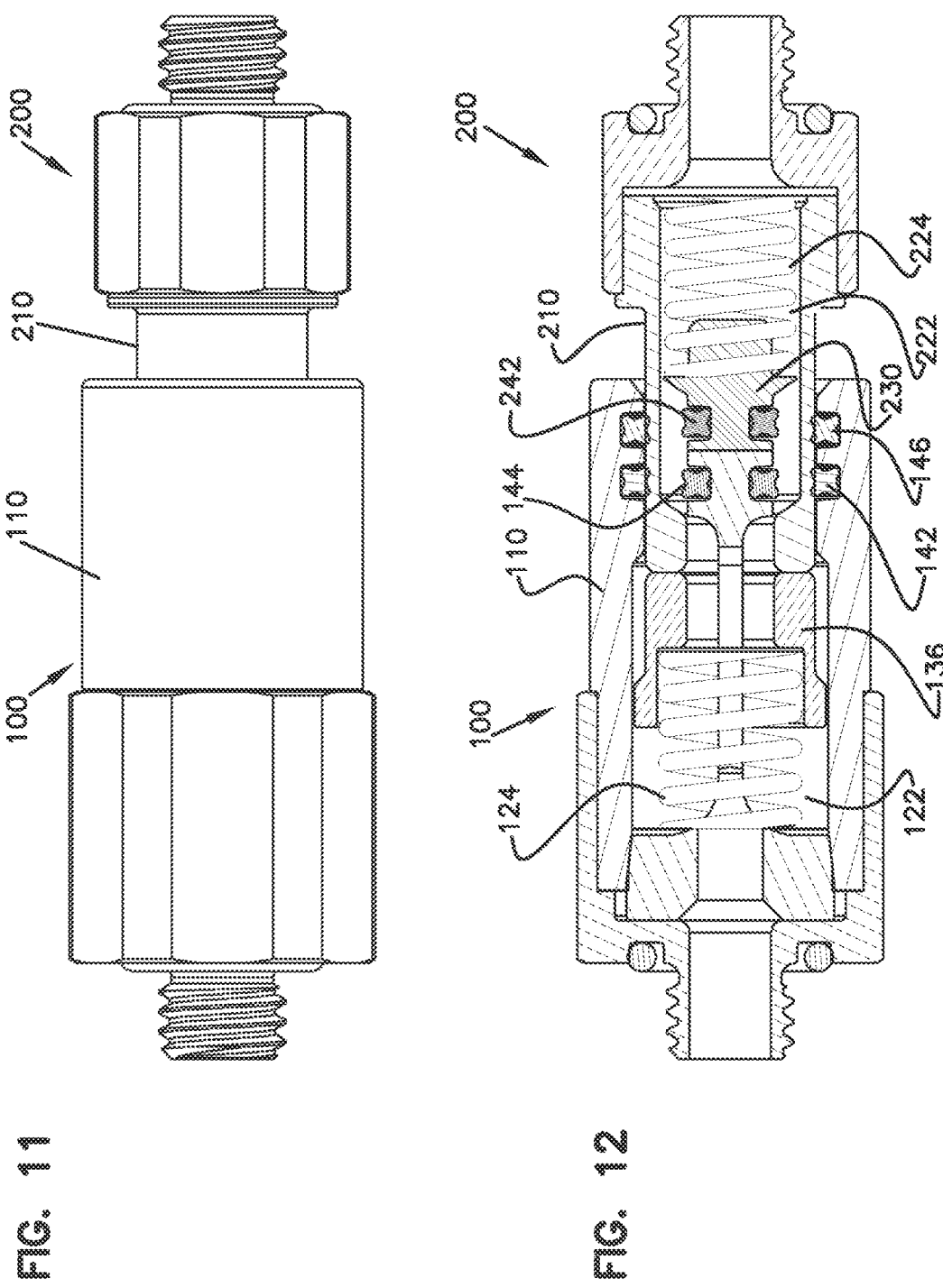
FIG. 11 is a side view of the female and male coupling devices in a partially-coupled position.
FIG. 12 is a cross-sectional view of the female and male coupling devices of FIG. 11.

Referring now to FIGS. 11-12, the female coupling device 100 and the male coupling device 200 are shown in a partially-coupled position. In this position, the main body 210 of the male coupling device 200 is more-completely inserted into the opening 114 of the main body 110 of the female coupling device 100.

As this occurs, the main body 210 of the male coupling device 200 is positioned in the fluid passageway 122 so that both seals 142, 146 engage the main body 210. Further, both the sleeve 136 and the valve member 230 are displaced against the springs 124, 224, respectively. When this occurs, the seals 144, 242 are disengaged so that fluid can start to flow through the fluid passageways 122, 222.

Figures 13, 14:
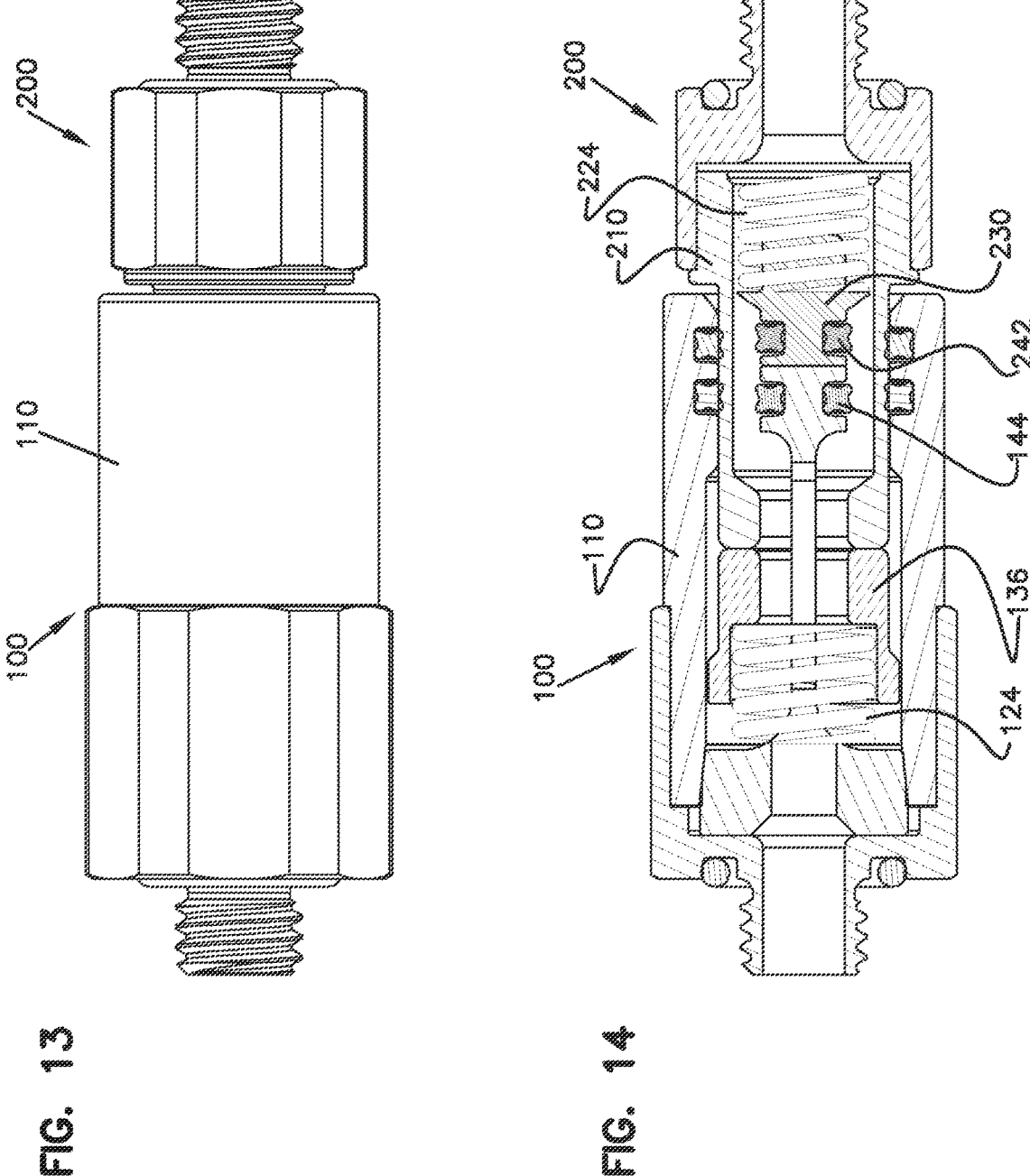
FIG. 13 is a side view of the female and male coupling devices in a fully-coupled position.
FIG. 14 is a cross-sectional view of the female and male coupling devices of FIG. 13.

Referring now to FIGS. 13-14, the female coupling device 100 and the male coupling device 200 are shown in a fully-coupled position. In this position, the main body 210 of the male coupling device 200 is completely inserted into the opening 114 of the main body 110 of the female coupling device 100.

Both of the springs 124, 224 are compressed, and the sleeve 136 and valve member 230 are further displaced. This assures that seals 144, 242 are fully disengaged so that fluid can pass through the fluid passageways 122, 222.

To release, the male coupling device 200 is pulled out of the female coupling device 100. When this occurs, the springs 124, 224 return the sleeve 136 and the valve member 230 to the resting positions shown in FIGS. 9-10.

Referring now to FIGS. 15-18, another example female coupling device 300 is shown.

The female coupling device 300 includes a main body 310 having a front face 312. The front face 312 defines an opening 314 leading into a fluid passageway 322 (see FIG. 18).

The female coupling device 300 also includes a termination 318 coupled to the main body 310 using known techniques, such as sonic welding, staking, press-fitting, and threading. The termination 318 is configured to be coupled to another component, such as a fluid line or device. The female coupling device 300 includes a locking collar, herein referred to as a quick connecting/disconnecting clip member 316, which is used to quickly disconnect and connect the female coupling device 300 with another component.

The example female coupling device 300 includes a stem 330, sleeve 336, and spring 324 positioned within the fluid passageway 322. The stem 330 includes a base end 332 positioned against the termination 318. The stem 330 also includes a stem head 334 positioned within the sleeve 336. The spring 324 is positioned about the stem 330 and biases the sleeve 336 into the closed position shown in FIG. 18. In this position, a shoulder 382 on the sleeve 336 engages a surface 384 formed by the main body 310 to limit further travel of the sleeve 336 in a direction toward the front face 312. In this position, a first seal 342 provides a seal between the main body 310 and the sleeve 336. In addition, a second seal 344 provides a seal between the sleeve 336 and the stem head 334. These seals limit movement of fluid through the fluid passageway 322. A further third seal 346 is positioned at the opening 314 of the main body 310 to seal against a mating male coupling device 400, as described below.

Figure 15:
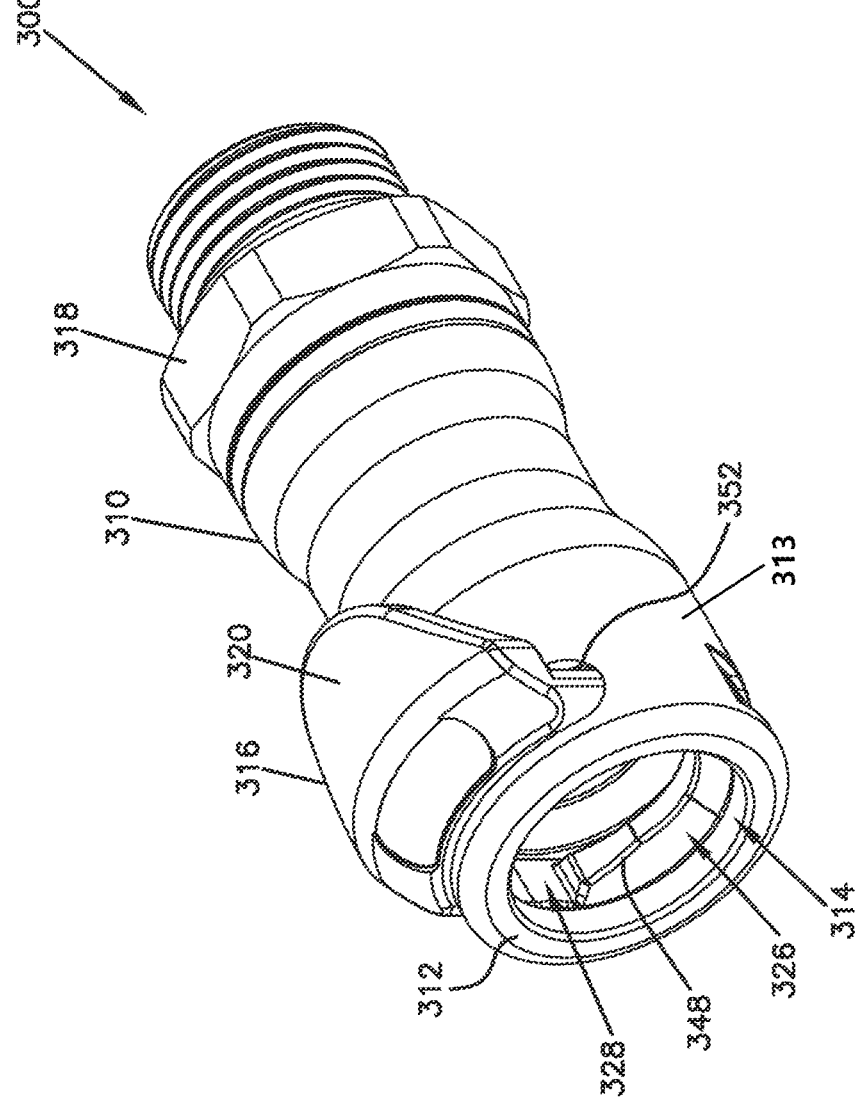
FIG. 15 is a perspective view of another example female coupling device.
Figure 16:
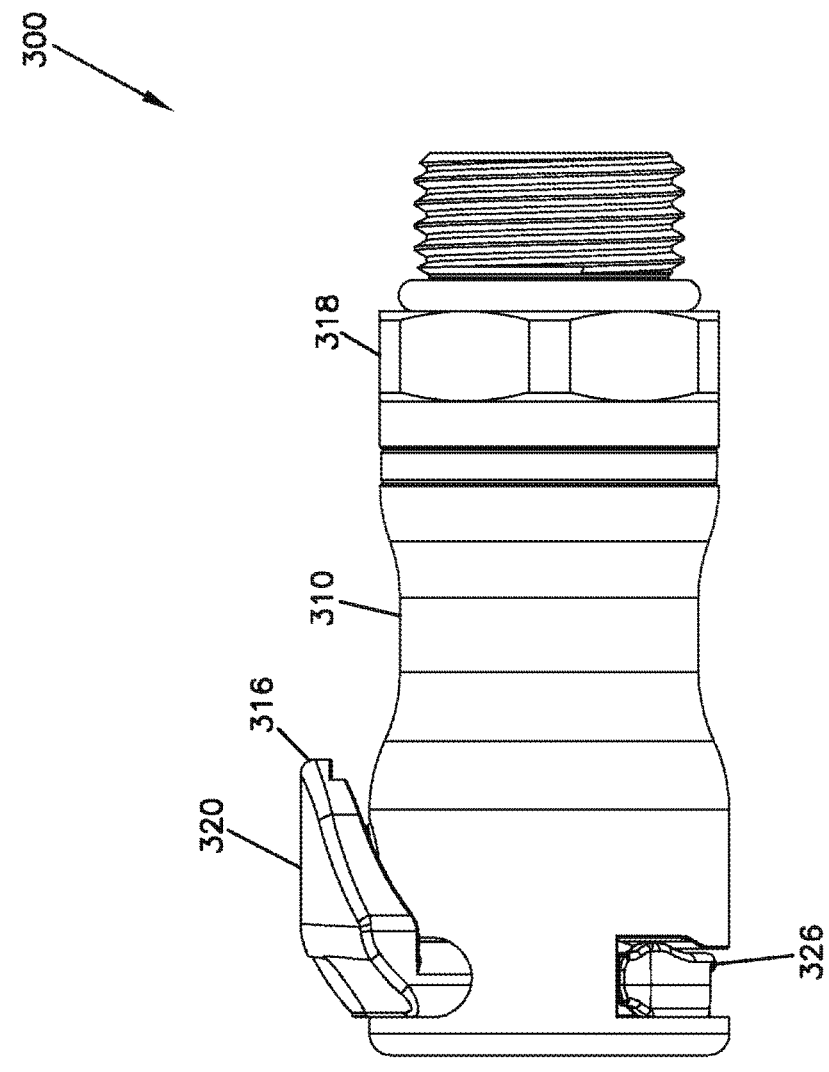
FIG. 16 is a side view of the female coupling device of FIG. 15.
Figure 17:
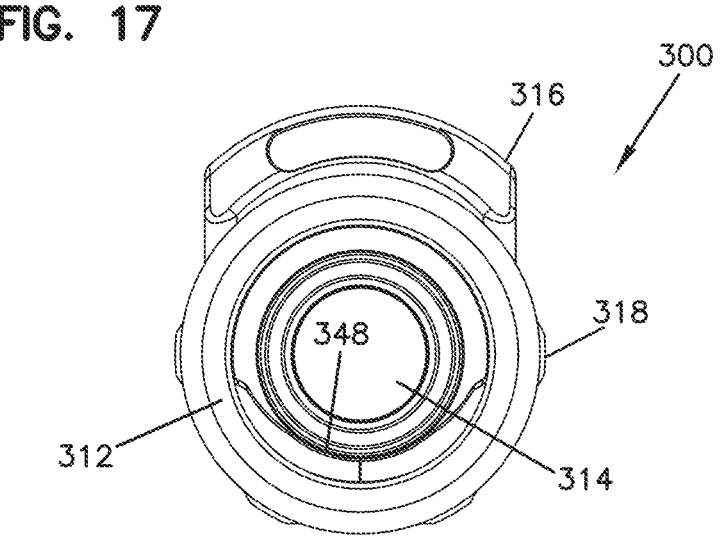
FIG. 17 is an end view of the female coupling device of FIG. 15.
Figure 18:
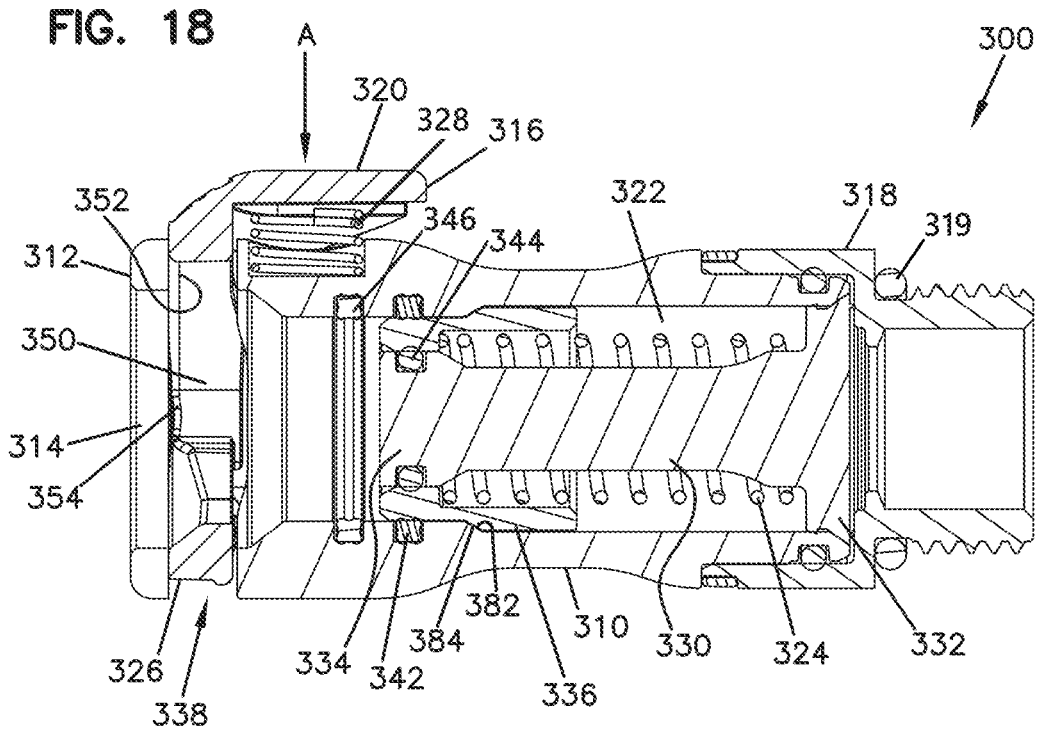
FIG. 18 is a cross-sectional view of the female coupling device of FIG. 15.
Figure 19:
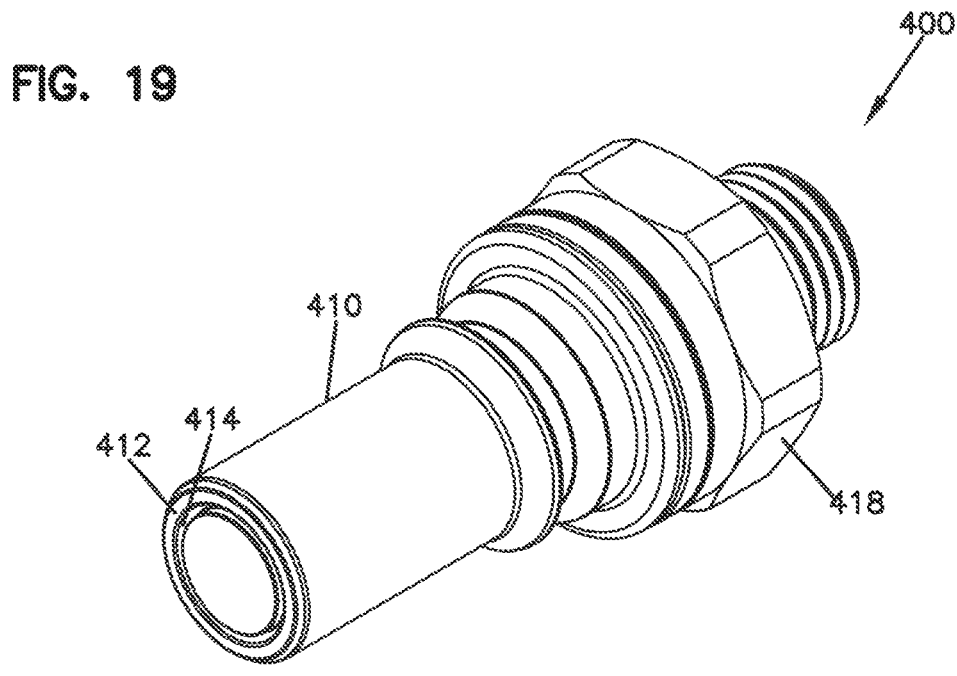
FIG. 19 is a perspective view of another example male coupling device.
Figure 20:
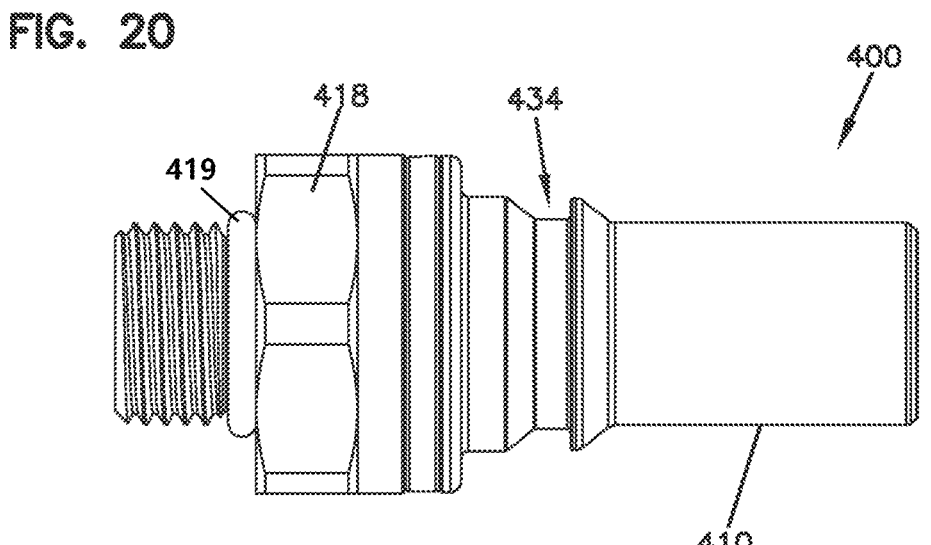
FIG. 20 is a side view of the male coupling device of FIG. 19.
Figure 21:
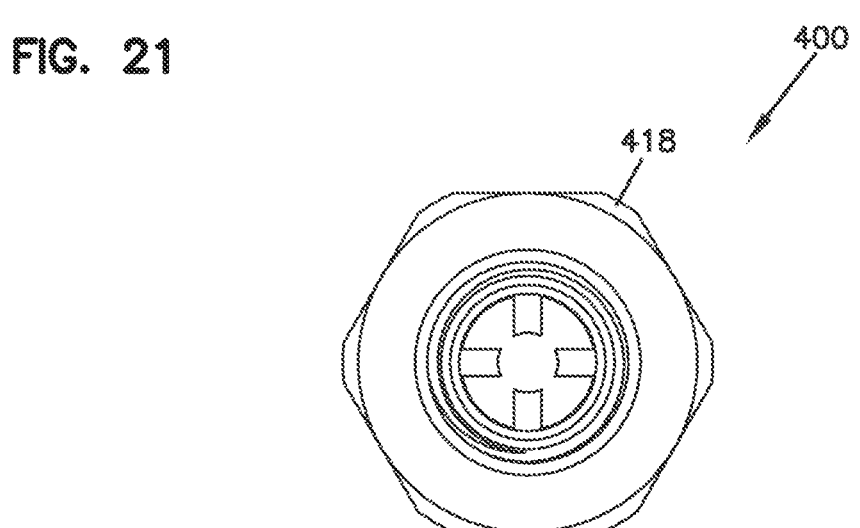
FIG. 21 is an end view of the male coupling device of FIG. 19.
Figure 22:
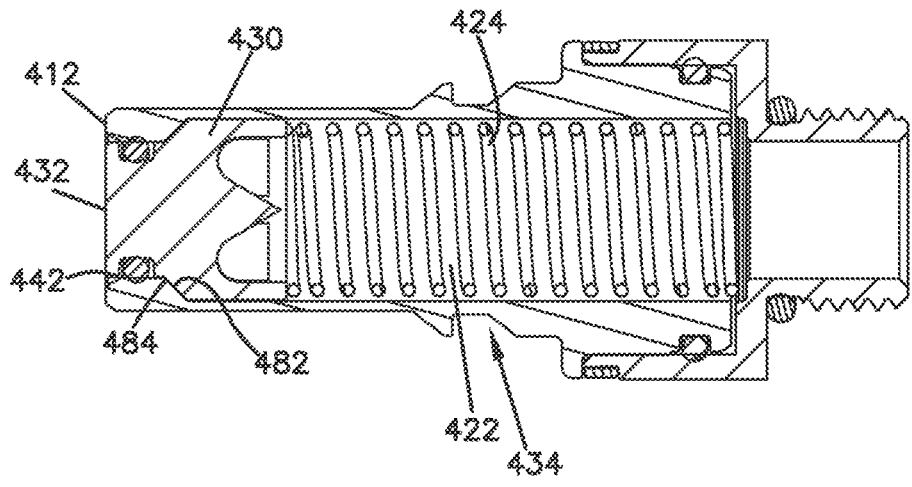
FIG. 22 is a cross-sectional view of the male coupling device of FIG. 19.

In the depicted example, the clip member 316 includes a tab portion 320 and a plate portion 326 interconnected to each other at roughly a right angle in a generally L-shaped configuration. In FIG. 15, the clip member 316 is in a resting or locking position. The clip member 316 can be biased or forced into the locked position using an integral cantilever or spring 328 (see FIG. 18). The clip member 316 is moved in a direction A within an opening 338 of the main body 310 to an unlocked position. The clip member 316 can be moved to this position to, for example, connect or release another component, such as, an insert.

The tab portion 320 of the clip member 316 provides a surface for the user to press down on the clip member 316 so as to place the clip member 316 in the disconnecting position when inserting the mating male coupling device 400. In some examples, it is not necessary to manually force down on the clip member 316 when inserting the mating male coupling device 400 as the mating male coupling device 400 upon engagement with an inner lip 348 (see FIG. 15) of the plate portion 326 will force the clip member 316 down into the disconnecting position. The plate portion 326 defines an aperture 350 (see FIG. 18) sufficiently large to allow the mating male coupling device 400 to extend partially therethrough and is generally alignable with the fluid passageway 322 of the female coupling device 300. The plate portion 326 slides in a slot 352 extending transversely of the female coupling device 300.

In one example, side surfaces of the female coupling device 300 can include a shoulder portion and the plate portion 326 of the clip member 316 can include barbed projections along its side edge. The barbed projections can have a substantially flat portion for engaging the shoulder portion of the female coupling device 300 so as to prevent the clip member 316 from being inadvertently removed from the female coupling device 300 after it has been inserted. This assures that the clip member 316 will remain with the female coupling device 300 at all times in typical use.

Referring now to FIGS. 19-22, the male coupling device 400 is shown.

The male coupling device 400 includes a main body 410 having a front face 412. The front face 412 defines an opening 414 leading into a fluid passageway 422 (see FIG. 22).

The male coupling device 400 also includes a termination 418 coupled to the main body 410 using known techniques, such as sonic welding or staking. The termination 418 is configured to be coupled to another component, such as a fluid line.

The example male coupling device 400 includes a valve member 430 and spring 424 positioned within the fluid passageway 422. The spring 424 biases the valve member 430 into the closed position shown in FIG. 22. A front surface 432 of the valve member 430 is exposed at the front face 412 of the main body 410. In this position, a shoulder 482 on the valve member 430 engages a surface 484 formed by the main body 410 to limit further travel of the valve member 430 in a direction toward the front face 412.

In this position, a first seal 442 (e.g., major seal) provides a seal between the main body 410 and the valve member 430. The seal limits movement of fluid through the fluid passageway 422.

Figure 23:
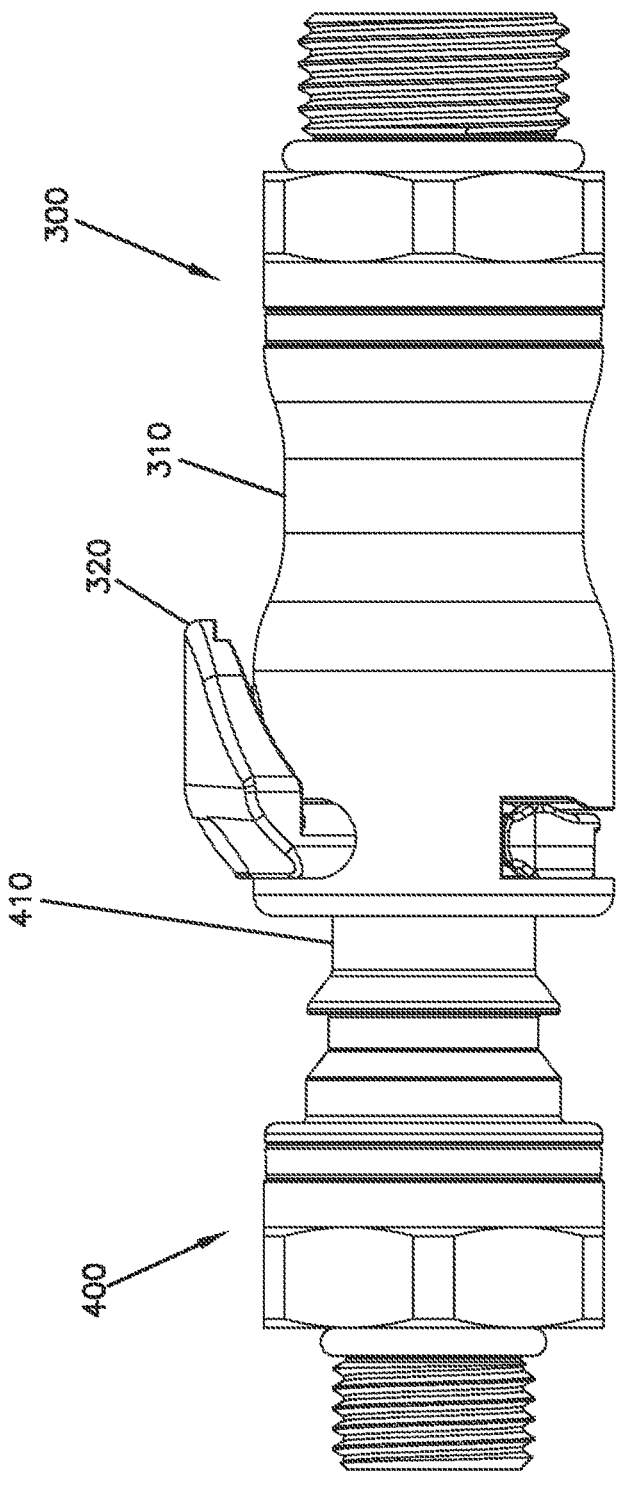
FIG. 23 is a side view of a coupling assembly including the female and male coupling devices shown in FIGS. 15 and 19 in a pre-coupled position.
Figure 24:
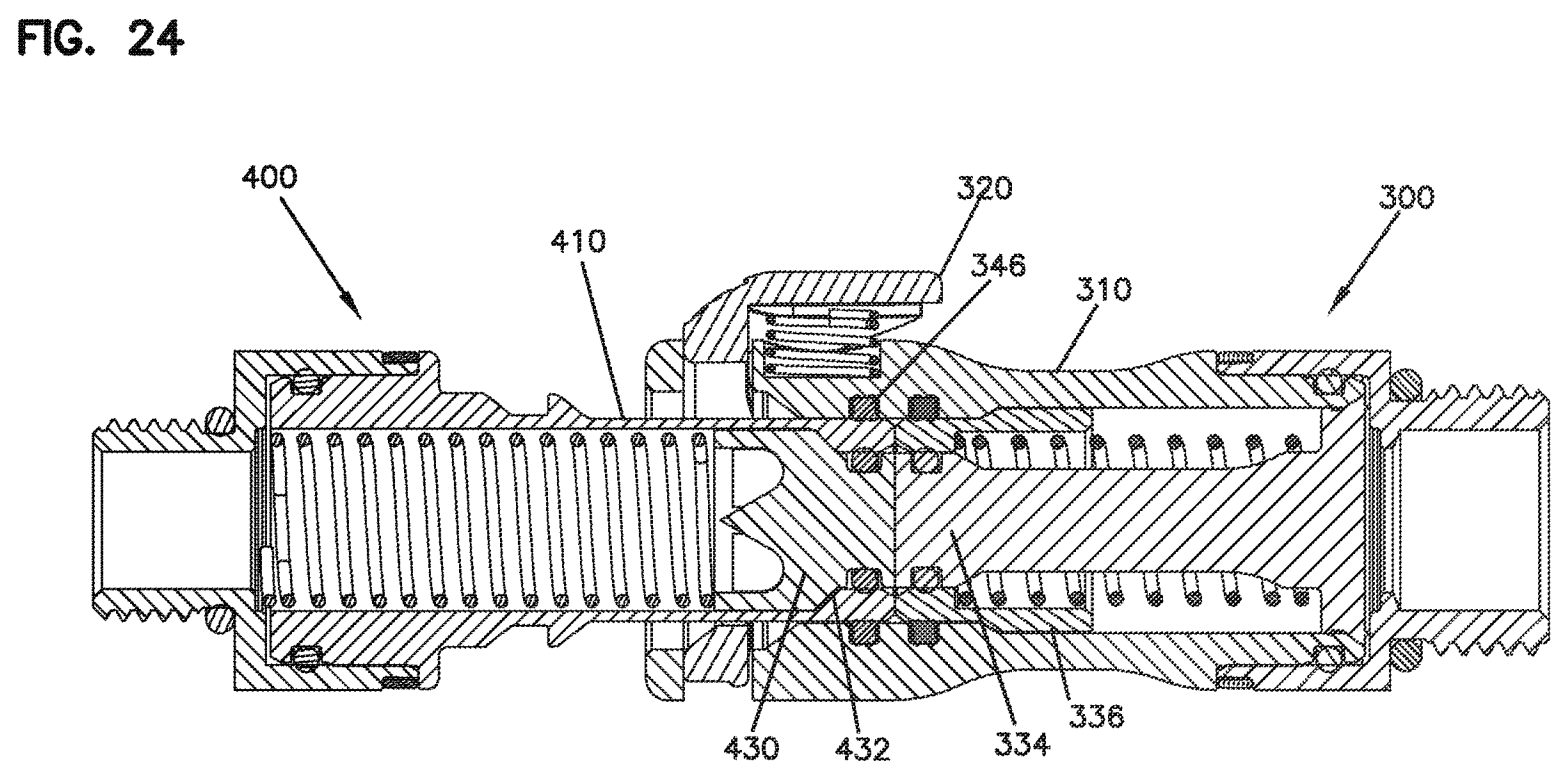

Referring now to FIGS. 23-24, the female coupling device 300 and the male coupling device 400 are shown in a pre-coupled position. In this position, the main body 410 of the male coupling device 400 is partially inserted into the opening 314 of the main body 310 of the female coupling device 300.

In this position, the front surface 432 of the valve member 430 engages the stem head 334. In addition, the front face 432 engages the sleeve 336. Further, the third seal 346 seals against the main body 410 of the male coupling device 400 so that a fluid-tight configuration is created.

7                                                              8

Figure 25:
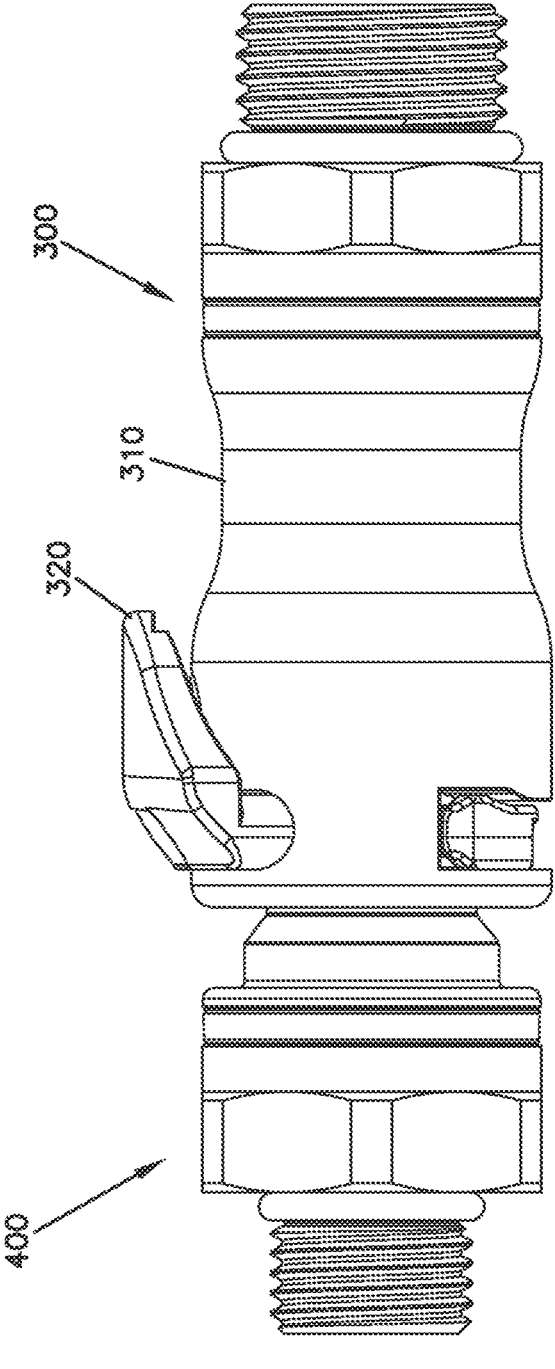
FIG. 25 is a side view of the female and male coupling devices shown in FIGS. 15 and 19 in a partially-coupled position.
Figure 26:
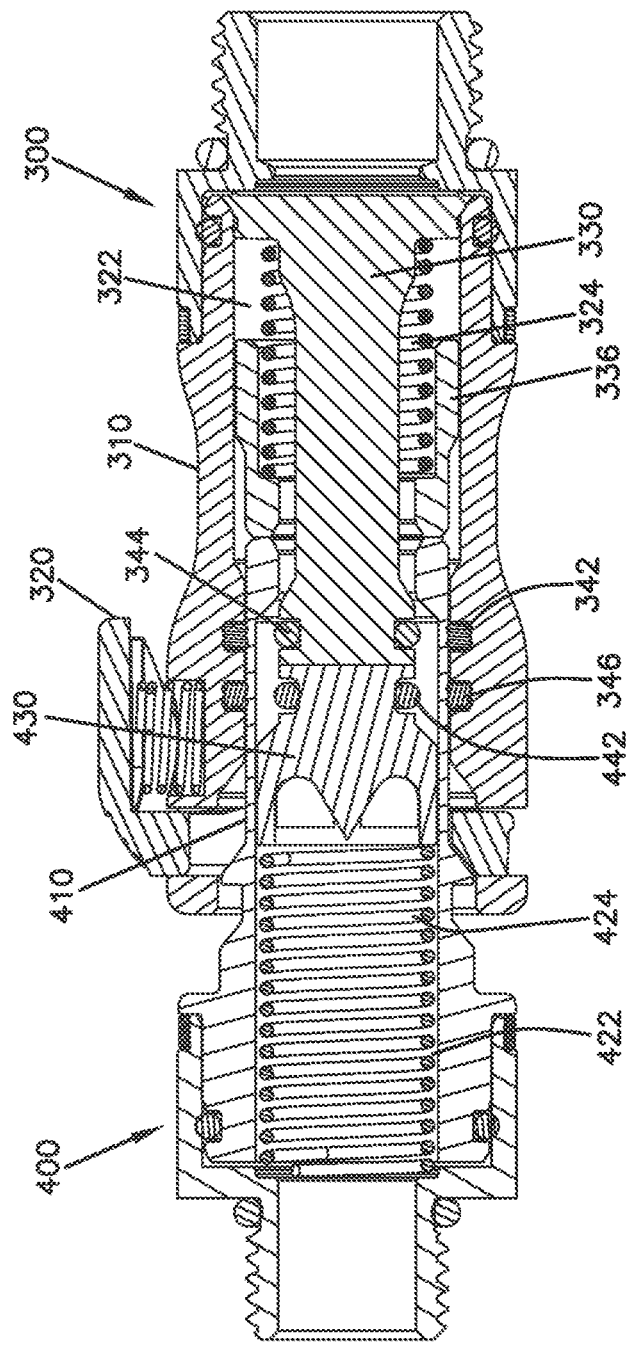
FIG. 26 is a cross-sectional view of the female and male coupling devices of FIG. 25.

Referring now to FIGS. 25-26, the female coupling device 300 and the male coupling device 400 are shown in a partially-coupled position. In this position, the main body 410 of the male coupling device 400 is more-completely inserted into the opening 314 of the main body 310 of the female coupling device 300.

As this occurs, the main body 410 of the male coupling device 400 is positioned in the fluid passageway 322 so that both seals 342, 346 engage the main body 410. Further, both the sleeve 336 and the valve member 430 are displaced against the springs 324, 424, respectively. When this occurs, the seals 344, 442 are disengaged so that fluid can start to flow through the fluid passageways 322, 422.

Figure 27:
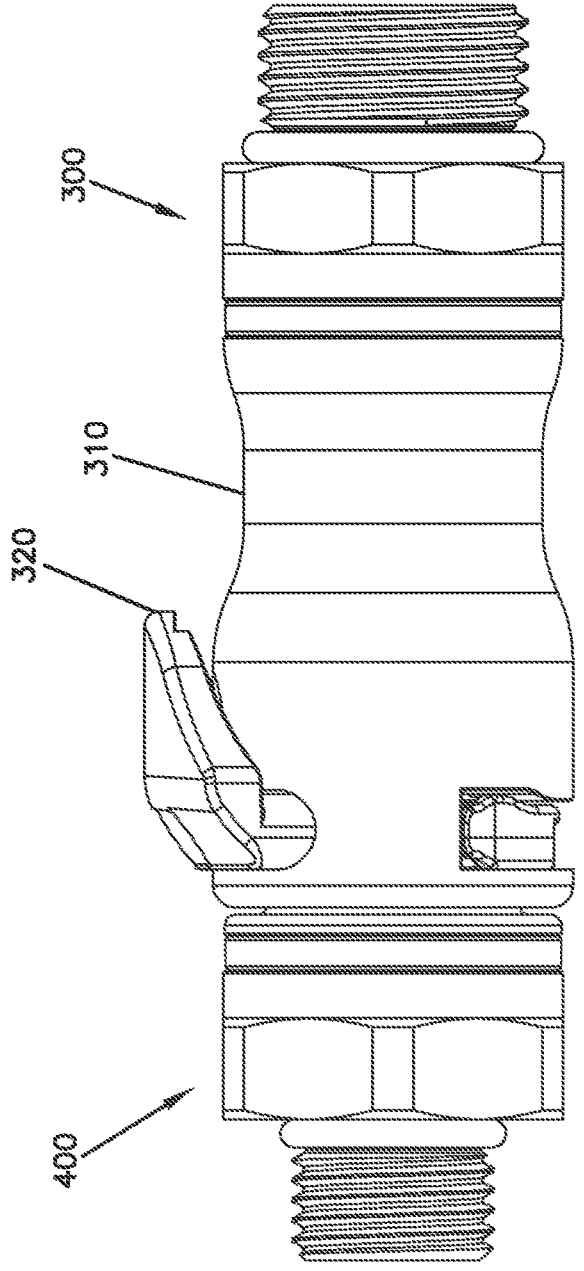
FIG. 27 is a side view of the female and male coupling devices shown in FIGS. 15 and 19 in a fully-coupled position.
Figure 28:
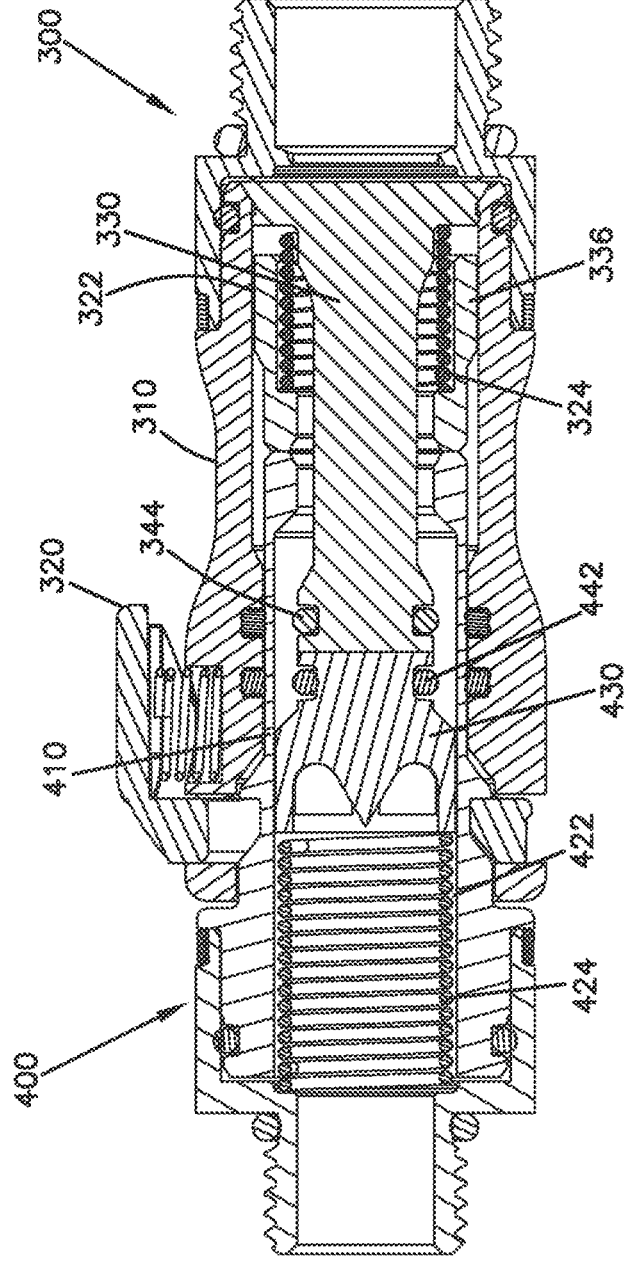
FIG. 28 is a cross-sectional view of the female and male coupling devices of FIG. 27.

Referring now to FIGS. 27-28, the female coupling device 300 and the male coupling device 400 are shown in a fully-coupled position. In this position, the main body 410 of the male coupling device 400 is completely inserted into the opening 314 of the main body 310 of the female coupling device 300.

Both of the springs 324, 424 are compressed, and the sleeve 336 and valve member 430 are further displaced. This assures that seals 344, 442 are fully disengaged so that fluid can pass through the fluid passageways 322, 422.

To release, the male coupling device 400 is pulled out of the female coupling device 300. When this occurs, the springs 324, 424 return the sleeve 336 and the valve member 430 to the resting positions shown in FIGS. 23-24.

In certain examples, the spring 328 (e.g., resilient biasing member) is disposed below the tab portion 320. Upon pressing down on the clip member 316, the spring 328 is displaced from its at rest position to a displaced position. The clip member 316 is then biased upwardly such that the plate portion 326 rests in a circumferential groove 434 of the male coupling device 400 when in the connecting position. In other words, the clip member 316 is biased upwardly such that when the circumferential groove 434 of the male coupling device 400 is aligned with the inner lip 348 of the plate portion 326 of the clip member 316, the spring 328 will force the clip member 316 upward into engagement with the circumferential groove 434 thereby placing the clip member 316 into the connecting position and retaining the male and female coupling devices 300, 400 in a coupled state upon the application of the fluid pressure.

In other examples, by merely inserting the male coupling device 400, the clip member 316 will be forced down into its disconnecting position thereby doing away with the need for the user to press down on the tab portion 320 of the clip member 316. To uncouple the coupling the user simply presses down on the clip member 16 and removes the male coupling device 400.

Additional details about an example latched coupling assembly are provided in U.S. Pat. No. 7,547,047 to deCler et al. and U.S. Pat. No. 5,104,158 to Meyer et al., the entirety of which are hereby incorporated by reference.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A coupling system for liquid cooling of electronics, comprising:

a female coupling device having a quick disconnect lock and being configured to releasably receive a male coupling device in a pre-coupled position in which fluid flow is occluded between the female coupling device and the male coupling device, a partially-coupled position, and a fully-coupled position in which fluid flow is provided between the female coupling device and the male coupling device, wherein the female coupling device includes:

a female main body defining: a front opening at a front-most face of the female main body, a sidewall opening positioned rearwardly of front opening and being sized to receive a movable lock member, a first interior shoulder that is positioned rearwardly of the sidewall opening and that tapers inwardly to a first interior bore having a first bore diameter, the first interior bore extending rearwardly from the first interior shoulder for a first bore axial length to a second interior shoulder that transitions to a second interior bore, the second interior bore having a second bore diameter larger than the first bore diameter and having a second bore axial length greater than the first bore axial length, and one or more seal grooves disposed along the first interior bore, wherein both the sidewall opening and a front-most end of the first interior shoulder are positioned axially closer to the front opening of the female main body than to a front-most end of the second larger interior bore of the female main body;

a stem having a stem head positioned in the first interior bore and configured to remain stationary relative to the front-most face of the female main body, wherein the stem head defines a stem front face that is oriented toward the front opening and that has a stem front diameter greater than half the first bore diameter;

a valve sleeve movable within the second interior bore relative to the stem head, wherein the valve sleeve is biased by a first coil spring toward a closed position in which the valve sleeve abuts with the second interior shoulder of the female main body and is configured to occlude the first interior bore of the female main body, wherein the valve sleeve is movable to a rear position in which the valve sleeve is entirely rearward of the first interior bore; and the quick disconnect lock comprising the movable lock member slidable within the sidewall opening of the female main body, an exterior user-adjustable actuator engaged with the movable lock member for actuation of the movable lock member, and a second coil spring positioned entirely forward of the first coil spring at a location between the exterior user-adjustable actuator and the female main body so as to bias the quick disconnect lock toward a locked condition.

2. The coupling system of claim 1, wherein the female coupling device further comprises an exterior hex structure positioned closer to a rear opening of the female coupling device than to the front opening.

3. The coupling system of claim 1, wherein the second coil spring of the quick disconnect lock is compressed against a surface of the exterior user-adjustable actuator to urge the movable lock member into the sidewall opening of the female main body.

4. The coupling system of claim 3, wherein the exterior user-adjustable actuator of the quick disconnect lock defines a laterally outermost surface of the female coupling device.

5. The coupling system of claim 4, wherein the exterior user-adjustable actuator of the quick disconnect lock comprises a push tab defining the laterally outermost surface of the female coupling device, the movable lock member of the quick disconnect lock comprises a slidable plate extending transversely from the push tab such that the slidable plate defines a front-most surface of the quick disconnect lock closest to the front opening of the female main body, and the second coil spring of the quick disconnect lock is positioned entirely forward of the stem and the valve sleeve.

6. The coupling system of claim 1, wherein the female coupling device further comprises a rear termination member extending rearwardly of the second larger interior bore of the female main body opposite from the front opening of the female main body.

7. The coupling system of claim 6, wherein the rear termination member comprises rear connection ridges configured to connect with a fluid line.

8. The coupling system of claim 1, further comprising the male coupling device.

9. The coupling system of claim 8, wherein the male coupling device further comprises: a male main body having a male front end configured to slide within the first interior bore of the female main body and engage the valve sleeve of the female coupling device; a valve member that defines a valve front face and that has a valve seal mounted thereto, wherein the valve member is spring biased toward the male front end such that the valve seal is releasably engageable with the male main body, and the valve front face is radially inward of the male front end.

10. The coupling system of claim 9, wherein the male coupling device further comprises: a circumferential groove defined along an exterior of the male main body and configured to releasably lock with the movable lock member of the quick disconnect lock of the female coupling device when in the fully-coupled position.

11. The coupling system of claim 10, wherein the male coupling device further comprises a rear terminal positioned opposite from the male front end and being configured to connect with a fluid line.

12. The coupling system of claim 11, wherein the rear terminal of the male coupling device includes an exterior hex structure and an exterior thread extending between a rearmost end of the male coupling device and the exterior hex structure.

13. The coupling system of claim 11, wherein the rear terminal of the male coupling device defines a maximum lateral width of the entire male coupling device which is configured to remain external to the female main body when in the fully-coupled position.

14. The coupling system of claim 1, wherein said one or more seal grooves disposed along the first interior bore of the female main body comprises a rear groove positioned rearwardly of the first interior shoulder, the female coupling device further comprising a rear bore seal seated in the rear groove such that the rear bore seal is configured to releasable engage with an exterior of the valve sleeve.

15. The coupling system of claim 14, wherein said one or more seal grooves disposed along the first interior bore of the female main body comprises a forward groove positioned forwardly of the rear groove, the female coupling device further comprising a forward bore seal seated in the forward groove at a location radially inward from a portion of the quick disconnect lock that defines a laterally outermost surface of the entire female coupling device.

16. The coupling system of claim 15, wherein the first interior bore extends forward of the forward bore seal toward the front opening for a forward axial length, extends between the forward bore seal and the rear bore seal for an intermediate axial length, and extends rearward of the rear bore seal for a rearward axial length, wherein the forward axial length of the first interior bore of the female main body is greater than an axial length of the forward groove that retains the forward bore seal.

17. The coupling system of claim 1, wherein the stem includes a rear end that is opposite from the stem head and that defines a stem rear diameter greater than the second bore diameter of the second interior bore of the female main body.

18. The coupling system of claim 17, wherein the female coupling device further comprises a rear terminal that extends rearwardly of the second interior bore of the female main body and that defines a rear terminal bore diameter smaller than said second bore diameter of the second interior bore of the female main body.

19. The coupling system of claim 18, wherein the rear terminal bore diameter of the rear terminal extends rearwardly to a tapered bore opening that is larger than the rear terminal bore diameter.

20. The coupling system of claim 18, wherein the rear terminal is connected to a rear portion of the female main body with a seal mounted radially inward of an interior circumferential surface of the rear terminal and radially outward of the female main body, and the rear terminal includes an exterior hex structure, an exterior thread extending between a rearmost end of the rear terminal and the exterior hex structure, and an exterior rear seal positioned between the exterior thread and the exterior hex structure.

21. The coupling system of claim 1, wherein an exterior of the female main body includes: a first outer diameter positioned rearwardly of the sidewall opening, a central waist portion positioned rearwardly of the first outer diameter having a second outer diameter smaller than the first outer diameter, and a third outer diameter positioned rearwardly of the central waist portion and being larger than the second outer diameter.

22. The coupling system of claim 1, wherein the second coil spring of the quick disconnect lock is positioned within a blind exterior hole of the female main body at said location between the exterior user-adjustable actuator and the female main body, and the second coil spring of the quick disconnect lock is oriented along an axis that extends perpendicular to the first interior bore of the female main body.

23. The coupling system of claim 1, wherein said sidewall opening is a first sidewall opening, and the female main body comprises a second sidewall opening, wherein the movable lock member of the quick disconnect lock being slidable within both the first and second sidewall openings of the female main body.

24. The coupling system of claim 1, wherein the second coil spring is positioned entirely forward of the first coil spring at said location radially inward of the exterior user-adjustable actuator and radially outward of the first interior bore so as to bias the quick disconnect lock toward the locked condition.

25. The coupling system of claim 1, wherein the movable lock member of the quick disconnect lock is entirely forward of the first interior shoulder when the quick disconnect lock is in the locked condition.

26. The coupling system of claim 1, wherein at least a portion of the exterior user-adjustable actuator of the quick disconnect lock is located radially outward of both the first interior bore and the female main body.

27. The coupling system of claim 1, wherein said sidewall opening in the female main body has an axial length less than the first bore axial length.

* * * * *